US011333268B2

(12) United States Patent
Sugie

(10) Patent No.: US 11,333,268 B2
(45) Date of Patent: May 17, 2022

(54) DETERIORATION DETERMINATION DEVICE OF LIQUID PUMPING APPARATUS, AND LIQUID PUMPING APPARATUS

(71) Applicant: TLV CO., LTD., Hyogo (JP)

(72) Inventor: Yuichi Sugie, Kakogawa (JP)

(73) Assignee: TLV CO., LTD., Hyogo (JP)

( * ) Notice: Subject to any disclaimer, the term of this patent is extended or adjusted under 35 U.S.C. 154(b) by 184 days.

(21) Appl. No.: 16/826,799

(22) Filed: Mar. 23, 2020

(65) Prior Publication Data

US 2020/0217432 A1 Jul. 9, 2020

Related U.S. Application Data

(63) Continuation of application No. PCT/JP2018/026832, filed on Jul. 18, 2018.

(30) Foreign Application Priority Data

Sep. 25, 2017 (JP) .............................. JP2017-183269

(51) Int. Cl.
*F16K 37/00* (2006.01)
*F04F 1/06* (2006.01)

(52) U.S. Cl.
CPC ............ *F16K 37/0041* (2013.01); *F04F 1/06* (2013.01); *F05B 2270/506* (2013.01); *F05B 2270/80* (2013.01)

(58) Field of Classification Search
CPC .. F16K 37/0041; F04F 1/06; F05B 2270/506; F05B 2270/80
(Continued)

(56) References Cited

U.S. PATENT DOCUMENTS 5,655,888 A * 8/1997 Yumoto ................ F04B 49/025
417/132
2013/0074608 A1* 3/2013 Tanaka ..................... F22B 37/38
73/861.42
2013/0153062 A1* 6/2013 Young ..................... F23N 1/002
137/557

FOREIGN PATENT DOCUMENTS

JP H08145290 A 6/1996
JP 2002213399 A 7/2002
(Continued)

OTHER PUBLICATIONS

The extended European search report issued by the European Patent Office dated Oct. 20, 2020, which corresponds to European Patent Application No. 18857873.6-1008 and is related to U.S. Appl. No. 16/826,799.
(Continued)

*Primary Examiner* — Angelisa L. Hicks
(74) *Attorney, Agent, or Firm* — Studebaker & Brackett PC

(57) ABSTRACT

Disclosed is a deterioration determination device for a liquid pumping apparatus including: a casing that forms a reservoir space for storing liquid flowed thereto; a feed valve that introduces working gas into the reservoir space; an exhaust valve that releases the working gas from the reservoir space; and a valve operating mechanism having a float arranged in the reservoir space, and performing a pumping stroke in which the liquid is pumped from the reservoir space under a pressure of the working gas by opening the feed valve and closing the exhaust valve when the float moves up to a predetermined high level, and an inflow stroke in which the liquid flows into the reservoir space and the working gas is released from the reservoir space by closing the feed valve and opening the exhaust valve when the float moves down to a predetermined low level. The deterioration determina-
(Continued)

tion device includes a first pressure sensor arranged to communicate with a lower portion of the reservoir space to detect a pressure of a liquid layer in the reservoir space, and a deterioration determination unit that determines a degree of deterioration of the valve operating mechanism based on a change in the pressure detected by the first pressure sensor.

5 Claims, 3 Drawing Sheets

(58) Field of Classification Search
USPC .................................................. 137/192–196
See application file for complete search history.

(56) References Cited

FOREIGN PATENT DOCUMENTS

| | | |
|---|---|---|
| JP | 2011-106548 A | 6/2011 |
| JP | 2013024274 A | 2/2013 |
| JP | 6163617 B2 | 7/2017 |

OTHER PUBLICATIONS

International Search Report issued in PCT/JP2018/026832; dated Oct. 16, 2018.

* cited by examiner

DETERIORATION DETERMINATION DEVICE OF LIQUID PUMPING APPARATUS, AND LIQUID PUMPING APPARATUS

CROSS-REFERENCE TO RELATED APPLICATION

This is a continuation of PCT International Application PCT/JP2018/026832 filed on Jul. 18, 2018, which claims priority to Japanese Patent Application No. 2017-183269 filed on Sep. 25, 2017. The disclosures of these applications including the specifications, the drawings, and the claims are hereby incorporated by reference in their entirety.

FIELD

The present application relates to a deterioration determination device that determines the degree of deterioration of a liquid pumping apparatus.

BACKGROUND

A liquid pumping apparatus that recovers liquid generated in a steam system and pumps the liquid to a utilization side under a pressure of working gas has been known as disclosed by, for example, Japanese Unexamined Patent Publication No. H08-145290. The liquid pumping apparatus of Japanese Unexamined Patent Publication No. H08-145290 includes a hermetic container which stores a drain generated in and flowed from the steam system, a float contained in the hermetic container, a feed valve for supplying steam, and an exhaust valve for releasing the steam. The float is connected to the feed valve and the exhaust valve via a valve operating mechanism (a float arm and a snap mechanism). In this liquid pumping apparatus, the float moves up and down according to the level of the drain, and the feed valve and the exhaust valve are operated in response to the upward and downward movement of the float. When the float moves up to a predetermined high level, the feed valve is opened, and the exhaust valve is closed. Then, the steam is introduced into the hermetic container, and the drain is pumped from the hermetic container under the pressure of the steam (pumping stroke). When the float moves down to a predetermined low level, the feed valve is closed, and the exhaust valve is opened. Then, the drain flows into the hermetic container to be stored therein, and the steam is released from the hermetic container (inflow stroke).

SUMMARY

In the above-described liquid pumping apparatus, internal components of the valve operating mechanism are inevitably deteriorated due to wear or foreign matters (such as rust and scale) attached or deposited thereon. The internal components, if left deteriorated, eventually make the feed valve and the exhaust valve unable to be opened or closed, and the drain (liquid) cannot be pumped. To avoid such pumping failure, it is important to detect the degree of deterioration of the internal components to estimate the life of the liquid pumping apparatus in advance. So far, the life of the liquid pumping apparatus has been estimated based on the number of operations of the liquid pumping apparatus (e.g., the number of opening and closing of the feed valve and the exhaust valve). However, this estimation method has been disadvantageous because the degree of deterioration of the internal components differs depending on the type and state of the liquid used, and the life cannot always be estimated accurately.

Under these circumstances, the present disclosure has been achieved to determine the degree of deterioration of the liquid pumping apparatus.

The present disclosure is directed to a deterioration determination device of a liquid pumping apparatus including a casing, a feed valve, an exhaust valve, and a valve operating mechanism. The casing forms a reservoir space for storing liquid flowed thereto. The feed valve introduces working gas into the reservoir space. The exhaust valve releases the working gas from the reservoir space. The valve operating mechanism has a float arranged in the reservoir space. Further, the valve operating mechanism performs a pumping stroke in which the liquid is pumped from the reservoir space under a pressure of the working gas by opening the feed valve and closing the exhaust valve when the float moves up to a predetermined high level, and performs an inflow stroke in which the liquid flows into the reservoir space and the working gas is released from the reservoir space by closing the feed valve and opening the exhaust valve when the float moves down to a predetermined low level.

The deterioration determination device includes a first pressure sensor, and a deterioration determination unit. The first pressure sensor is arranged to communicate with a lower portion of the reservoir space to detect a pressure of a liquid layer in the reservoir space. The deterioration determination unit determines a degree of deterioration of the valve operating mechanism based on a change in the pressure detected by the first pressure sensor.

The present disclosure is also directed to a liquid pumping apparatus including the above-described deterioration determination device.

The deterioration determination device and liquid pumping apparatus of the present application can determine the degree of deterioration of the liquid pumping apparatus.

DESCRIPTION OF EMBODIMENTS

Embodiments of the present application will be described below with reference to the drawings. The embodiments below are merely exemplary ones in nature, and are not intended to limit the scope, applications, or use of the present disclosure.

Figure 1:
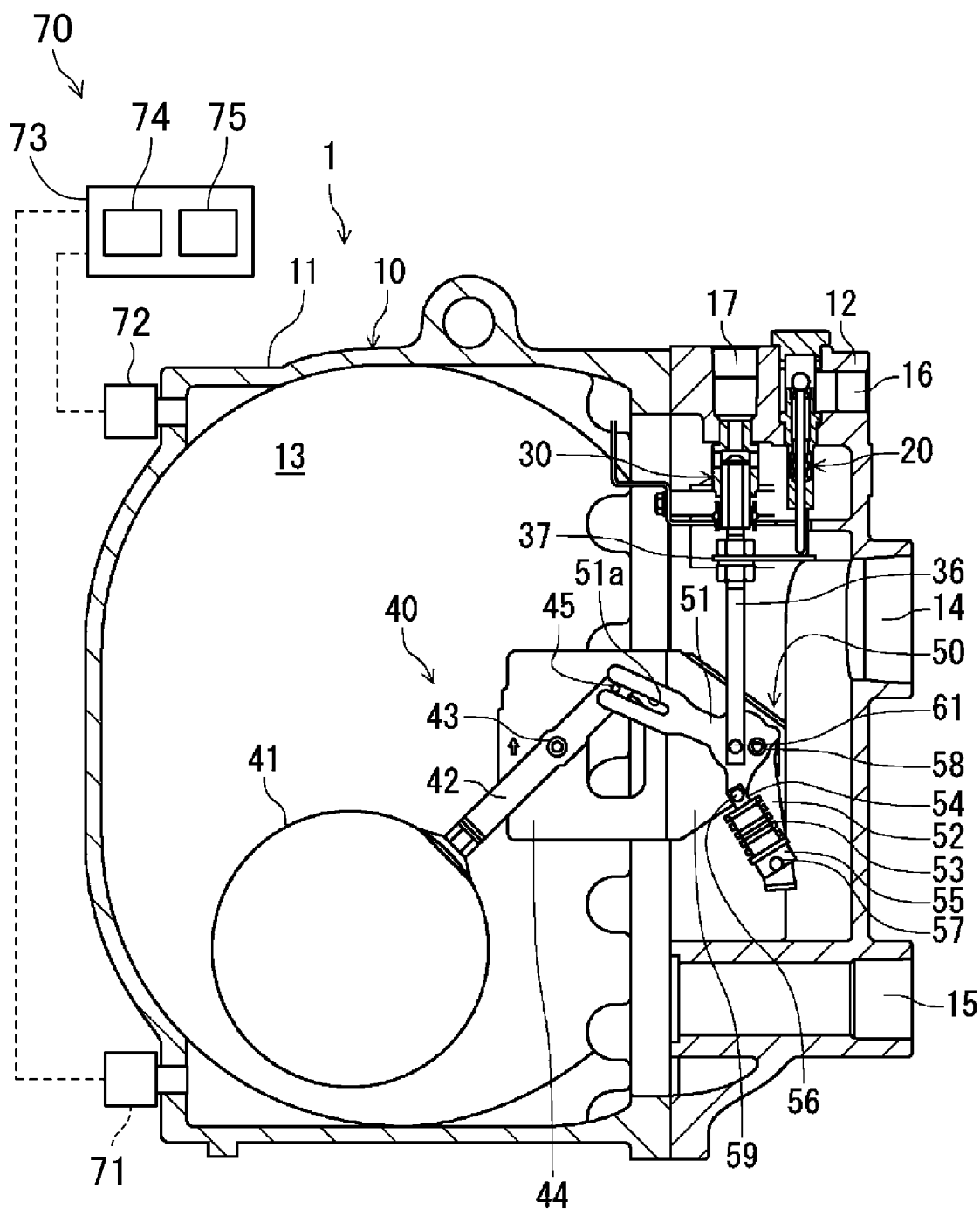
FIG. 1 is a cross-sectional view illustrating a schematic configuration of a liquid pumping apparatus according to an embodiment.

A liquid pumping apparatus 1 of the present embodiment is provided for a steam system, for example, and recovers a drain (condensation) generated as a result of condensation of steam to pump the drain to a boiler or a waste heat utilization system. Specifically, in the present embodiment, the drain corresponds to liquid recited in the claims of the present application. As shown in FIG. 1, the liquid pumping apparatus 1 includes a casing 10 which is a hermetic container, a feed valve 20, an exhaust valve 30, a valve operating mechanism 40, and a deterioration determination device 70.

The casing 10 has a body 11 and a lid 12 connected together with bolts, and forms a reservoir space 13 for storing the drain (liquid) flowed thereto. The lid 12 is provided with a liquid inlet 14 into which the drain flows, a liquid outlet 15 from which the drain is pumped (released), a gas inlet 16 into which the steam is introduced, and a gas outlet 17 from which the steam is released. In this embodiment, the steam corresponds to working gas recited in the claims of the present application. The liquid inlet 14 is formed close to an upper portion of the lid 12, and the liquid outlet 15 is formed in a lower portion of the lid 12. Both of the gas inlet 16 and the gas outlet 17 are formed in the upper portion of the lid 12. All these ports such as the liquid inlet 14 communicate with the reservoir space 13.

Figure 2:
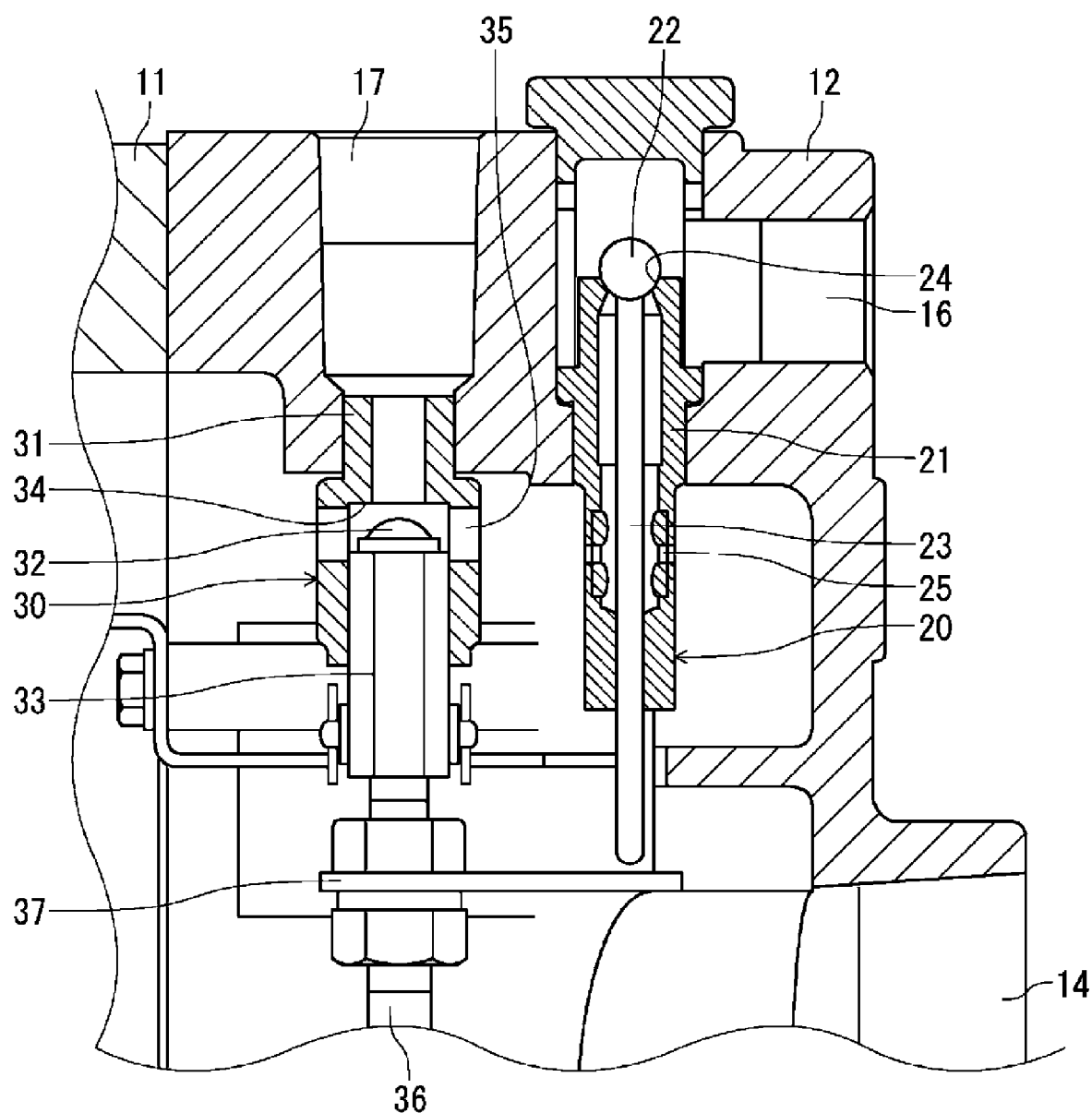
FIG. 2 is a cross-sectional view illustrating a schematic configuration of a feed valve and an exhaust valve in an enlarged scale.

As also shown in FIG. 2, the gas inlet 16 is provided with the feed valve 20, and the gas outlet 17 is provided with the exhaust valve 30. The feed valve 20 opens and closes the gas inlet 16, and the exhaust valve 30 opens and closes the gas outlet 17. The feed valve 20 introduces the steam from the gas inlet 16 into the reservoir space 13 to pump the drain from the reservoir space 13 through the liquid outlet 15. The exhaust valve 30 releases the steam that has introduced into the reservoir space 13 from the gas outlet 17.

The feed valve 20 has a valve case 21, a valve body 22, and a hoisting rod 23. The valve case 21 has a through hole penetrating in an axial direction thereof, and a valve seat 24 formed at the top of the through hole. An opening 25 that allows the through hole to communicate with the outside is formed in a middle portion of the valve case 21. The valve body 22 is formed in a spherical shape, and integrally provided at a top end of the hoisting rod 23. The hoisting rod 23 is inserted in the through hole of the valve case 21 to be movable up and down. When the hoisting rod 23 moves up, the valve body 22 of the feed valve 20 is separated from the valve seat 24 to open the gas inlet 16. When the hoisting rod 23 moves down, the valve body 22 is seated on the valve seat 24 to close the gas inlet 16.

The exhaust valve 30 has a valve case 31, a valve body 32, and a hoisting rod 33. The valve case 31 has a through hole penetrating in an axial direction thereof, and a valve seat 34 formed in a slightly upper portion of the through hole. An opening 35 that allows the through hole to communicate with the outside is formed in the valve case 31. The valve body 32 is formed in a substantially hemispherical shape, and integrally provided at a top end of the hoisting rod 33. The hoisting rod 33 is inserted in the through hole of the valve case 31 to be movable up and down. When the hoisting rod 33 moves up, the valve body 32 of the exhaust valve 30 is seated on the valve seat 34 to close the gas outlet 17. When the hoisting rod 33 moves down, the valve body 32 is separated from the valve seat 34 to open the gas outlet 17.

A valve operating rod 36 is coupled to a bottom end of the hoisting rod 33 of the exhaust valve 30. Specifically, the hoisting rod 33 of the exhaust valve 30 moves up and down as the valve operating rod 36 moves up and down. To the valve operating rod 36, a connector plate 37 extending to a region below the hoisting rod 23 of the feed valve 20 is attached. When the valve operating rod 36 moves up, the connector plate 37 lifts the hoisting rod 23 of the feed valve 20 up. When the valve operating rod 36 moves down, the connector plate 37 also moves down, and the valve operating rod 36 also moves down under its own weight. Specifically, when the valve operating rod 36 moves up, the feed valve 20 is opened (valve opening), and the exhaust valve 30 is closed (valve closing). When the valve operating rod 36 moves down, the feed valve 20 is closed (valve closing), and the exhaust valve 30 is opened (valve opening).

The valve operating mechanism 40 is arranged in the casing 10, and allows the valve operating rod 36 to move up and down to open and close the feed valve 20 and the exhaust valve 30. The valve operating mechanism 40 has a float 41 and a snap mechanism 50.

The float 41 is formed in a spherical shape, and has a lever 42 attached thereto. The lever 42 is rotationally supported by an axis 43 provided for a bracket 44. The lever 42 has an axis 45 provided at an end opposite to the float 41. The snap mechanism 50 has a float arm 51, a sub-arm 52, a coil spring 53, and two receiving members 54, 55. The float arm 51 has one end rotatably supported by an axis 58 provided for a bracket 59. The brackets 44, 59 are connected together with screws, and attached to the lid 12. The other end of the float arm 51 has a groove 51a, in which the axis 45 of the lever 42 fits. This configuration allows the float arm 51 to swing about the axis 58 as the float 41 moves up and down.

The float arm 51 has an axis 56. The sub-arm 52 has a top end rotatably supported by the axis 58, and a bottom end provided with an axis 57. The receiving member 54 is rotatably supported by the axis 56 of the float arm 51, and the receiving member 55 is rotatably supported by the axis 57 of the sub-arm 52. The coil spring 53 in a compressed state is attached between the receiving members 54, 55. The sub-arm 52 is provided with an axis 61, to which a bottom end of the valve operating rod 36 is coupled.

The valve operating mechanism 40 configured in this manner is displaced as the float 41 moves up and down, and allows the valve operating rod 36 to move up and down to open and close the feed valve 20 and the exhaust valve 30. More specifically, in the liquid pumping apparatus 1, the float 41 is positioned at the bottom of the reservoir space 13 when no drain is stored in the reservoir space 13. In this state, the valve operating rod 36 has moved down, the feed valve 20 is closed, and the exhaust valve 30 is open. When generated in the steam system, the drain flows into the liquid inlet 14 to be stored in the reservoir space 13 (inflow stroke). In the inflow stroke, the float 41 moves up as the amount of drain stored in the reservoir space 13 increases. In addition, the steam is released from the gas outlet 17 as the amount of drain stored in the reservoir space 13 increases. Then, when the float 41 moves up to a predetermined high level (upper reversal position), the snap mechanism 50 causes the valve operating rod 36 to move up. As a result, the feed valve 20 is opened, the exhaust valve 30 is closed, the inflow stroke ends, and a pumping stroke starts.

When the feed valve 20 is opened, the steam (high-pressure steam) in the steam system is introduced into an upper portion of the reservoir space 13 (space above the drain) through the gas inlet 16. The drain stored in the reservoir space 13 is then pushed downward by the pressure of the introduced gas, and pumped from the liquid outlet 15 (pumping stroke). The drain pumped by the liquid pumping apparatus 1 is supplied to a boiler or a waste heat utilization system. When the drain is pumped (released) out and the level of the drain in the reservoir space 13 is lowered, the float 41 moves down. Then, when the float 41 moves down to a predetermined low level (lower reversal position), the snap mechanism 50 causes the valve operating rod 36 to move down. As a result, the feed valve 20 is closed, the exhaust valve 30 is opened, the pumping stroke ends, and the inflow stroke restarts. That is, again, the drain flows into the liquid inlet 14 to be stored in the reservoir space 13, and the steam is released from the reservoir space 13 through the gas outlet 17.

In this manner, the valve operating mechanism 40 in the liquid pumping apparatus 1 opens and closes the feed valve 20 and the exhaust valve 30 to alternately perform the inflow stroke and the pumping stroke.

The deterioration determination device 70 is configured to determine the degree of deterioration of the liquid pumping apparatus 1 (valve operating mechanism 40). The deterioration determination device 70 includes a first pressure sensor 71, a second pressure sensor 72, and a device body 73.

The two pressure sensors 71, 72 detect the pressure of the reservoir space 13. The first pressure sensor 71 is provided at a lower portion of the body 11 of the casing 10, and communicates with an almost lowermost portion of the reservoir space 13. Specifically, the first pressure sensor 71 detects the pressure of a liquid layer in the reservoir space 13, i.e., the pressure of a region of the reservoir space 13 where the drain, which is one of the drain (liquid) or the steam (working gas), is present. The second pressure sensor 72 is provided at an upper portion of the body 11 of the casing 10, and communicates with an almost uppermost portion of the reservoir space 13. Specifically, the second pressure sensor 72 detects the pressure of a gaseous layer in the reservoir space 13, i.e., the pressure of a region of the reservoir space 13 where the steam, which is one of the drain (liquid) or the steam (working gas), is present.

The device body 73 includes a state determination unit 74 and a deterioration determination unit 75. The state determination unit 74 is configured to determine an operating state of the liquid pumping apparatus 1, i.e., which of the inflow stroke and the pumping stroke is performed.

The state determination unit 74 determines whether the liquid pumping apparatus 1 is in an operating state of performing the inflow stroke or the pumping stroke based on the pressure detected by the second pressure sensor 72. The state determination unit 74 successively receives the pressure detected by the second pressure sensor 72. More specifically, the state determination unit 74 determines that the pumping stroke is performed from when a predetermined amount of pressure rise is detected to when a predetermined amount of pressure drop is detected by the second pressure sensor 72. Further, the state determination unit 74 determines that the pumping stroke is performed from when a predetermined amount of pressure drop is detected to when a predetermined amount of pressure rise is detected by the second pressure sensor 72.

Figure 3:
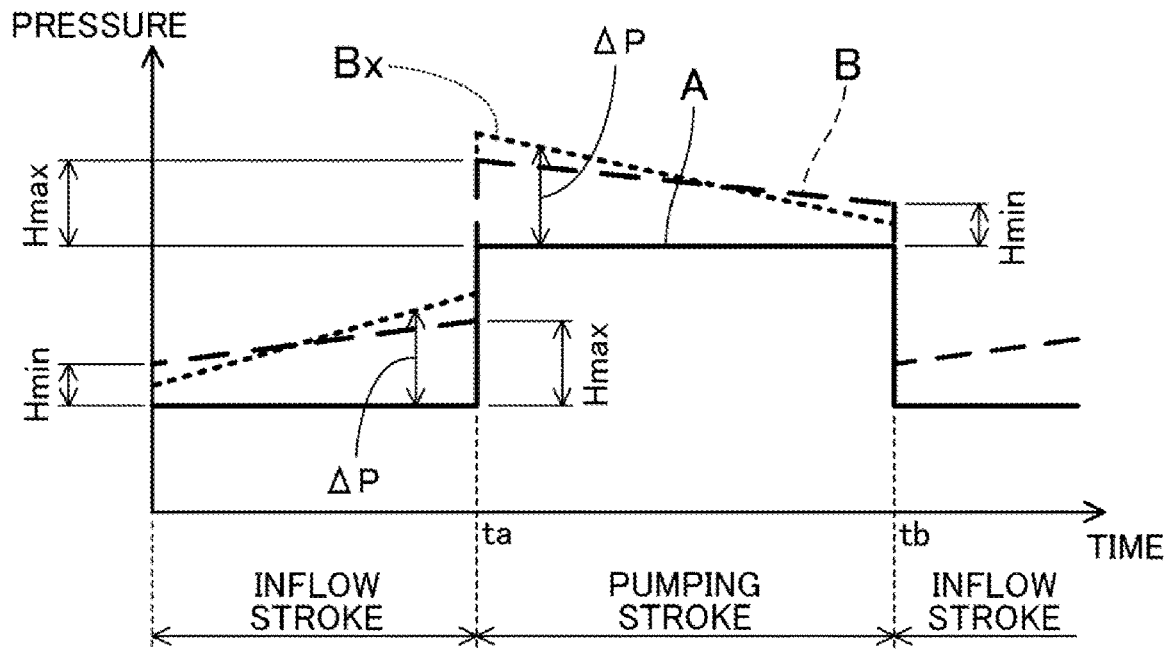
FIG. 3 is a graph showing a change in pressure of a storage space over time according to an embodiment.

Referring to FIG. 3, how the state determination unit 74 makes the determination will be described in detail below. The pressure detected by the second pressure sensor 72 (pressure of the gaseous layer in the reservoir space 13) changes over time as indicated by a solid line A shown in FIG. 3. In the inflow stroke, the drain flows into the reservoir space 13 and the steam is released from the reservoir space 13, and thus, the pressure detected by the second pressure sensor 72 remains at a substantially constant value. When the float 41 moves up to the predetermined high level (upper reversal position), the inflow stroke is switched to the pumping stroke (upper reversal point ta). When the stroke is switched to the pumping stroke, high-pressure steam is introduced into the reservoir space 13, and the pressure of the high-pressure steam pumps the drain out. Thus, the pressure detected by the second pressure sensor 72 becomes higher than that detected in the inflow stroke. Specifically, the second pressure sensor 72 detects the pressure instantaneously increased by a predetermined amount at the upper reversal point ta. In the pumping stroke, the pressure detected by the second pressure sensor 72 remains at a substantially constant value.

When the float 41 moves down to the predetermined low level (lower reversal position), the pumping stroke is switched again to the inflow stroke (lower reversal point tb). When the stroke is switched to the inflow stroke, the high-pressure steam is not introduced any more, and again, the drain flows into the reservoir space and the steam is released from the reservoir space as described above. Thus, the pressure detected by the second pressure sensor 72 becomes lower than that detected in the pumping stroke. Specifically, the second pressure sensor 72 detects the pressure instantaneously decreased by a predetermined amount at the lower reversal point tb.

Thus, the state determination unit 74 can determine that the pumping stroke is performed from when a predetermined amount of pressure rise is detected to when a predetermined amount of pressure drop is detected by the second pressure sensor 72. Further, the state determination unit 74 can determine that the inflow stroke is performed from when a predetermined amount of pressure drop is detected to when a predetermined amount of pressure rise is detected by the second pressure sensor 72. In addition, the state determination unit 74 can determine that a point of time when the predetermined amount of pressure rise is detected by the second pressure sensor 72 is the upper reversal point ta, and a point of time when the predetermined amount of pressure drop is detected by the second pressure sensor 72 is the lower reversal point tb. In this way, the operating state of the liquid pumping apparatus 1 can be determined.

For example, when the operating state of the liquid pumping apparatus 1 is monitored to detect signs of failure or abnormality of the liquid pumping apparatus 1 before the failure or abnormality actually occurs, criteria for detecting the signs differ depending on the operating state. Thus, if the operating state can be determined in the above-described manner, the signs can be detected accurately based on the criteria appropriate for the operating states.

The second pressure sensor 72, which is configured to detect the pressure of the gaseous layer in the reservoir space 13, can detect the pressure without being influenced by, for example, a shake of the drain (liquid) in the reservoir space 13. Therefore, determination can be performed with high accuracy.

The deterioration determination unit 75 is configured to determine the degree of deterioration of the valve operating mechanism 40 based on a change in the pressure detected by the first pressure sensor 71. Specifically, the deterioration determination unit 75 determines the degree of deterioration of the valve operating mechanism 40 based on a differential pressure $\Delta P$ obtained by subtracting the pressure detected by the second pressure sensor 72 from the pressure detected by the first pressure sensor 71.

Referring to FIG. 3, how the deterioration determination unit 75 performs the determination will be described in detail below. The first pressure sensor 71 communicates with the drain (liquid) in the reservoir space 13. Thus, as indicated by a rough broken line B in FIG. 3, the first pressure sensor 71 detects a pressure higher by a head of the drain than the pressure detected by the second pressure sensor 72. In the inflow stroke, the drain flows into the reservoir space to be stored therein, which gradually raises the head of the drain and the pressure detected by the first pressure sensor 71. In the pumping stroke, the drain is pumped (released) from the reservoir space, which gradually lowers the head of the drain and the pressure detected by the first pressure sensor 71. Just like the second pressure sensor 72, the first pressure sensor 71 detects the pressure instantaneously increased by a predetermined amount at the upper reversal point ta, and the pressure instantaneously decreased by a predetermined amount at the lower reversal point tb.

In the pumping stroke, the head reaches the maximum head Hmax at the upper reversal point ta, and the minimum head Hmin at the lower reversal point tb. Also in the inflow stroke, the head reaches the maximum head Hmax at the upper reversal point ta, and the minimum head Hmin at the lower reversal point tb. The maximum head Hmax and the minimum head Hmin in the pumping stroke are respectively equal to the maximum head Hmax and the minimum head Hmin in the inflow stroke.

In the valve operating mechanism 40, if a joint or any other portion of the float 41 or snap mechanism 50 is deteriorated due to wear or foreign matters (such as rust and scale) attached or deposited thereon, the displacement of the components decreases. For example, the upward and downward movements of the float 41 in accordance with the level of the drain in the reservoir space 13 decrease, or the movement of the float arm 51 of the snap mechanism 50 in response to the upward and downward movements of the float 41 decreases. This delays the opening (or closing) of the feed valve 20 and the exhaust valve 30 by the valve operating mechanism 40. Specifically, the upper reversal position at which the feed valve 20 is opened and the exhaust valve 30 is closed is shifted to a position higher than the predetermined high level, and the lower reversal position at which the feed valve 20 is closed and the exhaust valve 30 is opened is shifted to a position lower than the predetermined low level. The amount of shift increases with the increase in the degree of deterioration of the valve operating mechanism 40.

Thus, when the valve operating mechanism 40 is deteriorated, the pressure detected by the first pressure sensor 71 varies as indicated by a fine broken line Bx shown in FIG. 3. Specifically, the head (maximum head Hmax) at the upper reversal point ta is raised, and the head (minimum head Hmin) at the lower reversal point tb is lowered. Therefore, due to the deterioration of the valve operating mechanism 40, the pressure detected by the first pressure sensor 71 at the upper reversal point ta increases, and the pressure detected by the first pressure sensor 71 at the lower reversal point tb decreases.

The deterioration determination unit 75 determines that the valve operating mechanism 40 has been deteriorated when at least one of the following conditions is met. The conditions include: a condition that the differential pressure $\Delta P$ (pressure detected by the first pressure sensor 71—pressure detected by the second pressure sensor 72) is larger than a differential pressure $\Delta P$ at the time when the inflow stroke is normally switched to the pumping stroke; and a condition that the differential pressure $\Delta P$ is smaller than a differential pressure $\Delta P$ at the time when the pumping stroke is normally switched to the inflow stroke. The differential pressure $\Delta P$ at the time when the inflow stroke is normally switched to the pumping stroke is a differential pressure $\Delta P$ at the upper reversal point ta in a normal state, i.e., the maximum head Hmax in the normal state. The differential pressure $\Delta P$ at the time when the pumping stroke is normally switched to the inflow stroke is a differential pressure $\Delta P$ at the lower reversal point tb in the normal state, i.e., the minimum head Hmin in the normal state.

As indicated by the broken line Bx in FIG. 3, when the valve operating mechanism 40 is deteriorated, the differential pressure $\Delta P$ is larger than the maximum head Hmax in the normal state for a certain period of time, and is smaller than the minimum head Hmin in the normal state for a certain period of time. In the normal state, the differential pressure $\Delta P$ does not exceed the maximum head Hmax, or falls below the minimum head Hmin, at any time. Therefore, the valve operating mechanism 40 can be determined to be deteriorated when the differential pressure $\Delta P$ is detected to be larger than the maximum head Hmax, or smaller than the minimum head Hmin. Note that the deterioration determination unit 75 stores the values of the maximum head Hmax and the minimum head Hmin in the normal state in advance.

As can be seen in the foregoing, when the valve operating mechanism 40 is deteriorated, the head at the upper reversal point ta is raised and the head at the lower reversal point tb is lowered, which changes the pressure detected by the first pressure sensor 71. Therefore, the valve operating mechanism 40 can be determined (detected) to be deteriorated based on the change in the pressure detected by the first pressure sensor 71.

Variations of Embodiment

In the present disclosure, the deterioration determination unit 75 of the above embodiment may be configured in the following manner.

The deterioration determination unit 75 of the above embodiment has been configured to determine the degree of deterioration of the valve operating mechanism 40 based on the difference between the differential pressure $\Delta P$ and the maximum head Hmax or the minimum head Hmin in the normal state, irrespective of the operating state such as the upper reversal point ta and the lower reversal point tb.

Alternatively, the deterioration determination unit 75 may be configured to determine that the valve operating mechanism 40 is deteriorated when the differential pressure $\Delta P$ at the upper reversal point ta is larger than the maximum head Hmax in the normal state, or the differential pressure $\Delta P$ at the lower reversal point tb is smaller than the minimum head Hmin in the normal state. The upper and lower reversal points ta and tb are determined by the state determination unit 74. In this case, the differential pressure $\Delta P$ may be calculated only at the upper and lower reversal points ta and tb.

Figure 4:
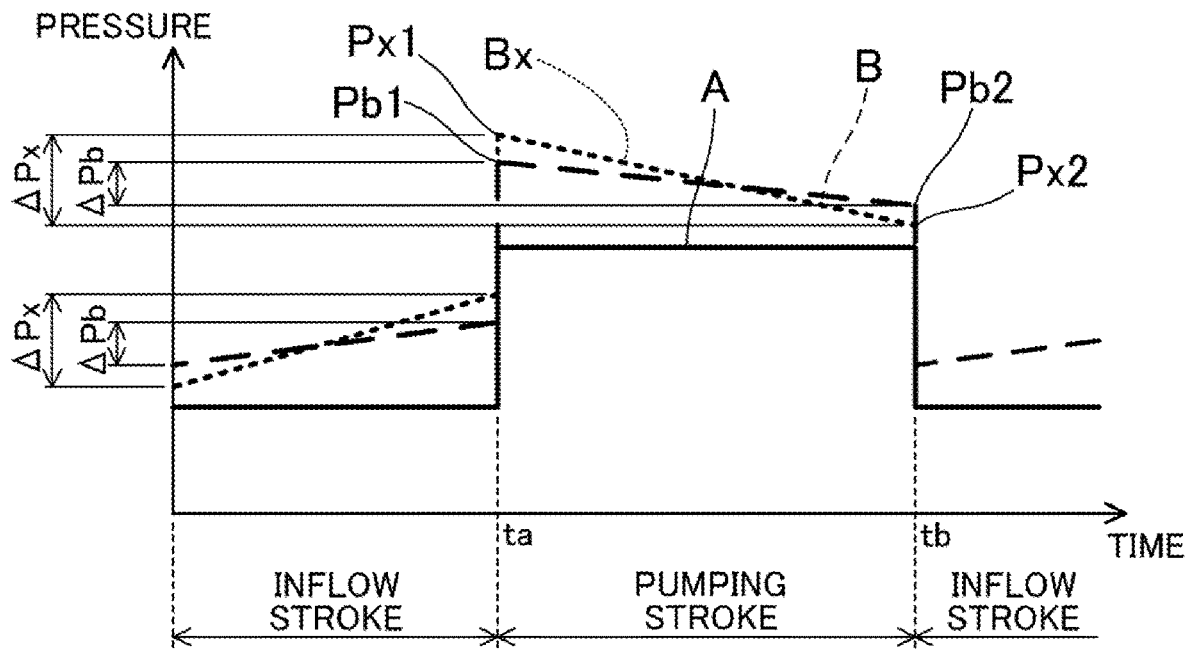
FIG. 4 is a view corresponding to FIG. 3, illustrating a change in pressure of a reservoir space over time according to a variation of an embodiment.

As another variation, as shown in FIG. 4, the deterioration determination unit 75 may be configured to determine that the valve operating mechanism 40 is deteriorated when an amount of change $\Delta Px$ in the pressure detected by the first pressure sensor 71 in the entire inflow stroke or pumping stroke is larger than an amount of change $\Delta Pb$ in the normal state. The amount of change $\Delta Px$ is a value obtained by subtracting the pressure $Px2$ detected by the first pressure sensor 71 at the lower reversal point tb from the pressure $Px1$ detected by the first pressure sensor 71 at the upper reversal point ta. The amount of change $\Delta Pb$ is a value obtained by subtracting the pressure $Pb2$ detected by the first pressure sensor 71 at the lower reversal point tb from the pressure $Pb1$ detected by the first pressure sensor 71 at the upper reversal point ta in the normal state. In this case, the state determination unit 74 determines the upper reversal point ta and the lower reversal point tb.

As another variation, as shown in FIG. 4, the deterioration determination unit 75 may be configured to determine that the valve operating mechanism 40 is deteriorated when the pressure $Px1$ detected by the first pressure sensor 71 at the upper reversal point ta is larger than the pressure value $Pb1$ detected in the normal state at the upper reversal point ta, or when the pressure Px2 detected by the first pressure sensor 71 at the lower reversal point tb is smaller than the pressure value Pb2 in the normal state at the lower reversal point tb. Also in this case, the state determination unit 74 determines the upper and lower reversal points ta and tb.

The variations described above can also provide the same advantages as those of the embodiment.

In the embodiment and variations described above, it has been described that the working gas is the steam. However, as a matter of course, any other types of gas may be used in the present disclosure.

In the embodiment and variations described above, it has been described that the liquid to be pumped is the drain. However, any other types of liquid may be used in the present disclosure.

The present application is useful for a deterioration determination device that determines the degree of deterioration of a liquid pumping apparatus.

What is claimed is:

1. A deterioration determination device for a liquid pumping apparatus comprising:
    a casing that forms a reservoir space for storing liquid flowed thereto;
    a feed valve that introduces working gas into the reservoir space;
    an exhaust valve that releases the working gas from the reservoir space; and
    a valve operating mechanism having a float arranged in the reservoir space, and the valve operating mechanism performing a pumping stroke in which the liquid is pumped from the reservoir space under a pressure of the working gas by opening the feed valve and closing the exhaust valve when the float moves up to a predetermined high level, and an inflow stroke in which the liquid flows into the reservoir space and the working gas is released from the reservoir space by closing the feed valve and opening the exhaust valve when the float moves down to a predetermined low level, wherein
    the deterioration determination device comprises:
        a first pressure sensor arranged to communicate with a lower portion of the reservoir space to detect a pressure of a liquid layer in the reservoir space; and
        a deterioration determination unit that determines a degree of deterioration of the valve operating mechanism based on a change in the pressure detected by the first pressure sensor, and
    wherein the deterioration determination unit determines that the valve operating mechanism is deteriorated when an amount of change in the pressure detected by the first pressure sensor in the entire inflow stroke or pumping stroke is larger than an amount of change in the pressure in a normal state.

2. The deterioration determination device of claim 1, further comprising:
    a second pressure sensor arranged to communicate with an upper portion of the reservoir space to detect a pressure of a gaseous layer in the reservoir space, wherein
    the deterioration determination unit determines the degree of deterioration of the valve operating mechanism based on a differential pressure obtained by subtracting the pressure detected by the second pressure sensor from the pressure detected by the first pressure sensor.

3. The deterioration determination device of claim 2, wherein
    the deterioration determination unit determines that the valve operating mechanism is deteriorated when at least one of conditions is met, the conditions including a condition that the differential pressure is larger than a differential pressure at the time when the inflow stroke is normally switched to the pumping stroke, or a condition that the differential pressure is smaller than a differential pressure at the time when the pumping stroke is normally switched to the inflow stroke.

4. The deterioration determination device of claim 1, further comprising:
    a state determination unit which determines that the liquid pumping apparatus is in an operating state of performing the pumping stroke from when a predetermined amount of pressure rise is detected to when a predetermined amount of pressure drop is detected by the first or second pressure sensor, and that the liquid pumping apparatus is in an operating state of performing the inflow stroke from when a predetermined amount of pressure drop is detected to when a predetermined amount of pressure rise is detected by the first or second pressure sensor.

5. A liquid pumping apparatus, comprising:
    a casing that forms a reservoir space for storing liquid flowed thereto;
    a feed valve that introduces working gas into the reservoir space;
    an exhaust valve that releases the working gas from the reservoir space;
    a valve operating mechanism having a float arranged in the reservoir space, and the valve operating mechanism performing a pumping stroke in which the liquid is pumped from the reservoir space under a pressure of the working gas by opening the feed valve and closing the exhaust valve when the float moves up to a predetermined high level, and an inflow stroke in which the liquid flows into the reservoir space and the working gas is released from the reservoir space by closing the feed valve and opening the exhaust valve when the float moves down to a predetermined low level; and
    a deterioration determination device comprising:
        a first pressure sensor arranged to communicate with a lower portion of the reservoir space to detect a pressure of a liquid layer in the reservoir space; and
        a deterioration determination unit that determines a degree of deterioration of the valve operating mechanism based on a change in the pressure detected by the first pressure sensor,
    wherein the deterioration determination unit determines that the valve operating mechanism is deteriorated when an amount of change in the pressure detected by the first pressure sensor in the entire inflow stroke or pumping stroke is larger than an amount of change in the pressure in a normal state.

* * * * *